April 28, 1964
J. W. ANDERSON
3,130,437
WINDSHIELD WIPER ASSEMBLY
Filed Sept. 15, 1961
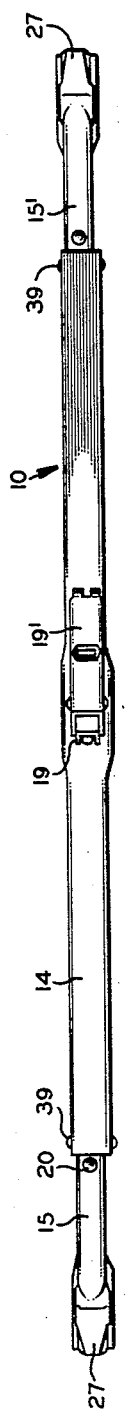
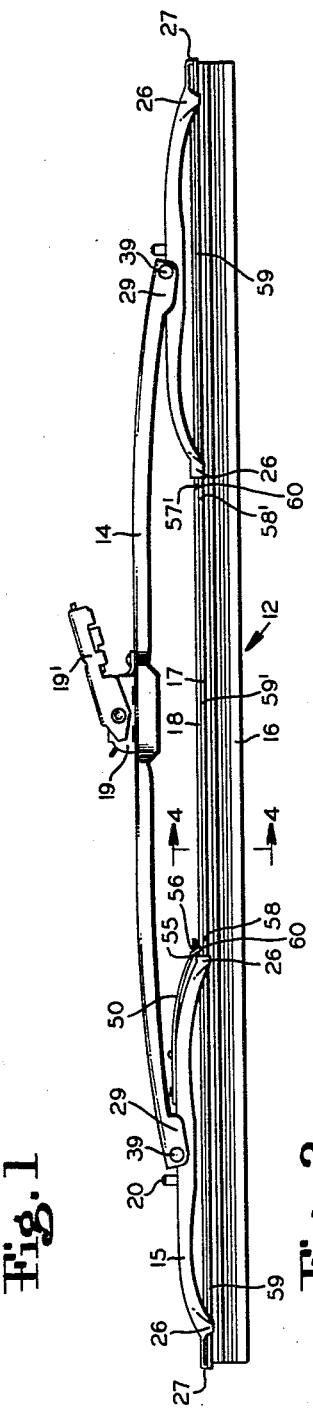
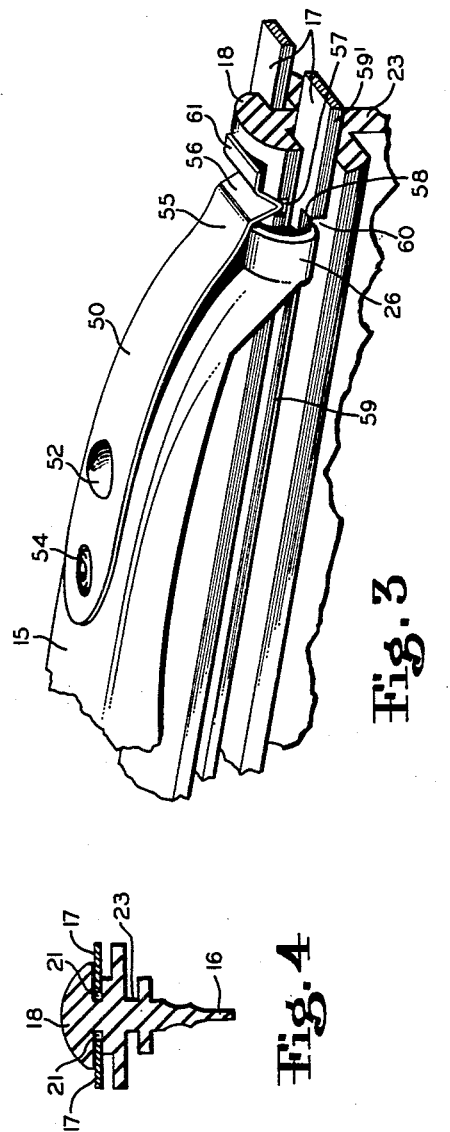
*INVENTOR.*
JOHN W. ANDERSON
BY
*Kenneth E. Walden*
ATTORNEY

United States Patent Office 3,130,437
Patented Apr. 28, 1964

3,130,437
WINDSHIELD WIPER ASSEMBLY
John W. Anderson, 578 Broadway, Gary, Ind.
Filed Sept. 15, 1961, Ser. No. 138,358
13 Claims. (Cl. 15—250.42)

This invention relates to an improved wiper for wiping windshields and other surfaces.

An object of the invention is to provide in a wiper structure an improved, convenient and inexpensive means for limiting the longitudinal movement of the pressure-distributing assembly lengthwise on the blade assembly as the blade is in operation, said means being so arranged as to produce a silencing effect upon the blade, achieved by eliminating or reducing the impact of metal parts of the pressure-distributing assembly upon the metal flexor or backing strip that carries the rubber wiper element.

Another object of this invention is to provide an improved and simplified structure by precluding all longitudinal movement of the wiping blade relative to the pressure-distributing or pressure-transmitting assembly at one connection therebetween while permitting when necessary relative longitudinal movement between the wiping blade and other connections of the pressure-distributing assembly.

Other objects and advantages of this invention will become apparent after the description hereinafter set forth is considered in conjunction with the drawing annexed hereto.

My device is an improvement on a windshield wiper of the type having an elongate wiping element supported in wiping position by an articulated superstructure receiving pressure from a wiping arm. The superstructure may take various forms but is shown herein as having a primary yoke adapted to receive pressure from an arm and apply that pressure to secondary yokes on the wiping element at spaced-apart points therealong. In accordance with the improved structure hereof, the inner end of one of the secondary yokes has a spring leaf or clip portion bent downwardly at one end to engage a slot provided across the back of the rubber wiping element adjacent the abutment means provided on the flexor. In assembling this secondary yoke, the rubber lying above the backing strip is somewhat compressed as the yoke is pushed into position. Upon the projection or clip at the inner end of the yoke reaching the slot in the rubber, it positions itself therein so that the adjacent claw member of the secondary yoke is held against longitudinal movement with respect to the blade as the blade flexes to conform to the windshield. This novel construction interferes not at all with the flexing of the blade in operation. It does, however, prevent relative longitudinal movement between the blade and the said claw, so that neither of the secondary yokes normally contacts the abutments or shoulders carried by the flexor, thus eliminating the shock and noise of such contact. Under such conditions the abutments or shoulders serve merely as a safeguard against possible failure of the groove across the rubber to hold the adjacent claw in position.

In the drawing:

FIGURE 1 is a plan view of the improved windshield wiper structure of the present invention;

FIGURE 2 is a side view of my invention showing the general arrangement of parts;

FIGURE 3 is an enlarged view showing an inner leg of a secondary yoke with its attachment to the flexor and to the back portion of the wiping element; and FIGURE 4 is a cross-sectional view taken along line 4—4 of FIGURE 2, showing the wiping element and flexor.

In the drawing, like numerals appearing throughout the different views indicate similar elements of the invention.

The complete windshield wiper unit including the superstructure or pressure-transmission means is designated generally by numeral 10. The unit is comprised of a wiper member including a resilient wiping element 12 of elongate form having a wiping edge 16 and a back portion 18. Wiping element 12 has a hinge portion 23 between the back portion 18 and the wiping edge 16 to establish flexibility and to provide for proper layover of the wiping element 16 as it traverses the windshield during a wiping stroke. Back portion 18 is provided with a pair of longitudinal grooves 21 on either side thereof extending substantially the full length of the wiping element for receiving a flexor 17 therein. Flexor 17 preferably is a unitary member having a pair of parallel portions each received in a respective groove 21 and positioned astride the neck portion between the grooves. Flexor 17, being of generally planar form, is flexible in one direction and relatively inflexible in a direction transverse thereto. It is readily apparent that a wiping element having a flexor carried thereby, as shown in FIGURES 2 and 4, will be flexible in a plane normal to a windshield surface being wiped and relatively inflexible in a plane perpendicular to said normal plane. A pair of transverse notches, shoulders or receiving means 57, 57' are provided across back 18 of wiper element 12 substantially equidistant from the ends and from each other. The purpose of these notches will be more fully discussed hereinafter.

A superstructure of articulate parts is provided for the wiping element 12 and consists as herein shown of a pressure-transmitting primary yoke 14 and a pair of pressure-transmitting secondary yokes 15, 15'. Each end of the primary member or yoke 14 is provided with a pair of downturned portions 29 which are spaced apart for receiving a respective secondary yoke or pressure-transmitting member 15 or 15' in pivotal connection therebetween. Connector 19 is secured to the mid-portion of member 14 for releasably receiving a rectifier 19' of a wiping arm.

Secondary yokes 15, 15' are pivotally connected to portions 29 of primary yoke 14 by pins 39. This connection between the primary and each of the secondary yokes may be a snap connection which is adapted for quick release. A specific connection of this type is clearly shown and described in an application of Fred A. Krohm, Serial No. 761,240, filed September 15, 1958, for "Detachably Connecting a Windshield Wiper Blade Unit and a Pressure Unit," issued October 10, 1962, as Patent No. 3,003,175. This type connection may be used with my improved windshield wiper to advantage; but my invention is not limited to using this type of connection, as others may be used as well.

Each end of the secondary yokes 15, 15' is provided with a pair of claws or clamps 26 which extend downwardly and inwardly to receive the adjacent portions of flexor 17 to provide a slidable connection therewith. The outer end of each secondary yoke is provided with a downturned flange portion 27 which overhangs back 18 of wiping element 12.

A downwardly biased spring clip member 50 is attached to the back or top portion of one of the secondary yokes 15 by spaced-apart rivets 52 and 54. The cantilevered or free end 55 thereof is normally spring-urged into engagement with one of the notch on the back of the blade but may be manually urged away from the secondary yoke 15 and back 18 as desired for release from the notch. It can be seen that this spring clip conforms substantially to the top surface of the secondary yoke and extends a distance beyond the adjacent end claw 26 and has a downwardly extending V-shaped catch portion 56. Spring 50 terminates in a flat portion 61 lying adjacent back 18 of wiping element 12. Spring member 50 is located on an inside leg of either of the secondary yokes, but not on both. FIGURE 3 clearly shows the catch portion 56 residing in notch 57 which extends across back portion 18 of the blade. As referred to above, a pair of receiving recesses or notches 57, 57' are formed in the back of the wiping element so that either one can receive catch portion 56. Therefore, the wiping element can be threaded or assembled either end first into claws 26 of secondary yokes 15, 15'. Both notches are shown in FIGURE 2; however, spring clip portion 56 is received in only one of them while the other normally remains unoccupied.

Flexor 17 is normally a unitary member having a pair of parallel linearly extending portions, the end portions 59 of which are narrower than central portion 59' defining a pair of shoulders 58, 58' on each outer edge of the parallel portion adjacent a claw 26. One shoulder 58 is most clearly shown in FIGURE 3. These shoulder portions on the flexor are so spaced dimensionally with respect to the primary and secondary yokes that they are positioned inboard a short distance from inner claws 26 of each secondary yoke 15, 15'; and catch or detent 56 of spring clip 50 seats in either recess 57 or 57' in such a manner as to provide a space 60 between claw 26 and a respective shoulder 58 or 58'. It is, therefore, apparent that metal-to-metal contact will be eliminated between the edge of each claw 26 and adjacent shoulder 58 or 58' thereby reducing shock and wear between the parts. Noise resulting from metal-to-metal contact will be eliminated. In the event of failure or accidental removal of catch 56 from a respective notch 57 or 57', shoulders 58 and 58' serve as safeguards to hold the claws 26 and flexor 17 assembled. When shoulders are not provided on the flexor, catch 56 cooperates with one notch 57 or 57' to prevent relative linear movement between the blade and the one adjacent claw. Again, in the event of inadvertent retraction of catch 56 from notch 57 or 57', catch 56 would ride on the back portion 18 and be resiliently urged thereagainst thereby frictionally resisting disasssembly of wiping element 12 from the superstructure.

Whenever wiping element 12 is to be assembled in operative position in the secondary yokes 15, 15', it is only necessary to slide the opposite ends 59 of the flexor 17 outwardly through claws 26 of yokes 15, 15'. Catch 56, being formed in a V-shape, is cammed upwardly against the spring action of resilient member 50 to slide along back 18 and will seat in the first notch 57 or 57' which it reaches. It may be found expedient to manually lift catch 56 away from back 18 rather than camming or sliding it to that position. A resilient but substantial connection is established between catch 56 of clip 50 and recess 57 or 57' of back 18 upon the engagement of the parts. The snap connection between the primary and secondary yokes can thereafter be established to complete the assembly. Removal of the secondary yoke 15 from the wiping element can be accomplished by substantial reversal of the above steps or by first releasing its snap connection and, secondly, manually lifting portion 56 of clip 50 from recess 57 and linearly sliding the wiping element and flexor from claws 26.

It is readily apparent that, in addition to providing a silencing effect between mating parts, I have in addition established a fixed connection between one claw 26 and the wiping element received thereby so that relative linear movement is not permitted. This insures an accurate orientation between the parts. It is pointed out that while relative movement is not permitted between one claw 26 and the wiping element 12, including flexor 17, the other connections remain relatively slidable; and by this arrangement wiping element 12 is free to be flexed into conformity with irregular surfaces being wiped.

The improvement of the present invention is not limited to use on the structure as shown in the drawing but may be used, for example, to advantage on a windshield wiper of the type shown in my Patent No. 2,920,336, issued January 12, 1960, or my application Serial No. 851,382, filed November 6, 1959.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. An elongate resilient wiping member adapted to conform to a surface being wiped, articulated pressure-transmitting means slidably connected to the wiping member at certain spaced-apart locations, one of the pressure-transmitting means having spring-biased movable means adjacent one connection and operatively engaging the wiping member thereby substantially preventing longitudinal movement of the wiping member relative to said one connection in either direction.

2. In combination with an elongate resilient wiping member for conforming to the surface of a windshield being wiped, articulated pressure-transmitting means slidably connected by certain connecting means to the wiping member, the improvement comprising; detent means carried by one of the articulated means and releasably biased into operative holding engagement with the resilient wiping member to substantially prevent relative movement in either direction between the wiping member and one portion of said articulated means.

3. In combination with an elongate resilient wiping member for conforming to the surface of a windshield being wiped, articulated pressure-transmitting means slidably connected by certain connecting means to the wiping member, the improvement comprising; elongate resilient clip means carried by one of the articulated means for resilient engagement with the wiping member to substantially prevent relative movement in either longitudinal direction between the wiping member and one portion of said articulated means.

4. The structure of claim 3 wherein the clip means is received by recess means on the wiping member.

5. An elongate resilient wiping element adapted to conform to a surface being wiped, an elongate flexor disposed along the wiping element for supporting the wiping element, pressure-transmitting means having spaced-apart receiving means longitudinally slidably connected to the flexor at certain spaced-apart locations, one of the receiving means of the pressure-transmitting means being provided with means adjacent said one receiving means operatively movable in the vertical longitudinal plane of said pressure-transmitting means to and resiliently engage opposed abutment means on the wiping element in a manner to restrain movement of the wiping element in either direction relative to said one connection.

6. The structure of claim 5 wherein said engaging means is resiliently urged into contact with said abutment means on the wiping element.

7. A wiper for wiping a surface comprising; a resilient blade for conforming to a surface to be wiped, a flexible backing member carried by the resilient blade permitting flexure of the blade in a plane generally normal to the surface being wiped and being relatively inflexible in a plane normal to said first-mentioned plane, a primary yoke having an arm-receiving means, secondary yokes each connected intermediate their ends to a respective end of the primary yoke and having certain of their ends slidably connected to the backing member, and detent means on a secondary yoke adjacent a connection thereof in operative engagement with the blade thereby restraining relative linear movement in either longitudinal direction between said adjacent connection and said blade portion received by said connection while permitting relative linear movement of the other connections and the portion of the blade adjacent to them.

8. A windshield wiper unit comprising an elongate resilient flexible body having a back portion and a wiping edge conformable to a surface to be wiped, a pair of transversely aligned grooves formed in the body extending substantially throughout the length thereof and positioned between said back portion and said wiping edge, elongate backing means flexible in a plane substantially perpendicular to the surface to be wiped and substantially inflexible in a plane at right angles to said first-mentioned plane, said backing means having a pair of longitudinally extending edges positioned in said pair of transversely aligned grooves, in combination with a superstructure, said superstructure including spaced-apart integral clamp means having their end portions partially surrounding parts of said back portion and said backing means for retaining said backing means in lateral engagement with said grooves, the end portions of each of said clamp means being longitudinally rigidly aligned with each other, and only certain of said clamp means having longitudinal sliding movement with respect to said unit whereby said unit in adjusting to surface curvature is free to slide with respect to said certain clamp means, and means for applying pressure at spaced-apart points to said unit to conform the wiping edge thereof to the surface being wiped, said pressure-applying means including an elongate bridge member rockably connected adjacent its ends with said clamp means substantially medial the ends of each of the latter, said unit intermediate said clamp means providing a free medial span capable of elongation in conforming to irregular curvatures by lengthwise movement of said unit in said certain clamp means, said superstructure having detent means carried thereby adjacent one of said clamp means for operative engagement with opposed abutments on said back portion restraining linear movement in either direction of said back portion relative to said last-named clamp means while permitting freely such linear movement of other said clamp means with relation to said back portion.

9. In a windshield wiper, a subassembly comprising an elongate resilient wiping element adapted to conform to a surface being wiped, a flexible backing strip attached to said wiping element substantially throughout its length and coactive therewith, a pressure-transmitting assembly adapted to receive pressure from a windshield wiper arm and distribute such pressure thru connections to spaced-apart points on said wiping element and backing-strip assembly, and detent means carried by said pressure-transmitting assembly adjacent one of said connections and engaging said wiping element to prevent relative linear movement in either direction of said wiping element adjacent said connection with respect to said one connection, said other connections slidably receiving said wiping element for relative movement therebetween.

10. In a windshield wiper assembly, an elongate resilient wiping element adapted to conform to a surface being wiped, a flexible backing strip attached to said wiping element substantially throughout its length and coactive therewith, a pressure-transmitting assembly adapted to receive pressure from a windshield wiper arm and distribute such pressure to spaced-apart points on said wiping element and backing-strip assembly, and biased detent means carried by said pressure-transmitting assembly and normally urged toward and engaging said wiping element and backing-strip assembly in such manner as to prevent, adjacent one of said pressure points, relative movement in either direction of said pressure-transmitting assembly with relation to said wiping element and backing-strip assembly.

11. In a windshield wiper assembly wherein a blade is supported by an articulated pressure-transmitting means having yoke members connected to the blade at spaced-apart points and bridge means connected to the yoke members and adapted to receive pressure from a wiper arm and apply that pressure through the yokes to the blade at said spaced-apart points therealong wherein one of the yoke members has a resiliently biased means thereon adjacent a pressure-transmitting point biased into contact with the blade, the improvement in the blade comprising: an elongate resilient wiping element having a back portion and a wiping portion, elongate backing means flexible in one plane and being relatively inflexible in a plane transverse thereto supporting the wiping element, said backing means adapted to be received by the yoke members whereby the wiping element is flexible in a plane toward a surface being wiped, said back portion having recess means including opposed abutments for receiving the biased means to thereby limit relative longitudinal movement of the wiping element in either direction with respect only to said one pressure-applying point.

12. An elongate resilient wiping member adapted to conform to a surface being wiped, said wiping member including a stiffening member permitting flexure of the wiping member in a plane generally normal to the surface being wiped and being relatively inflexible in a plane substantially normal to the first-mentioned plane, said stiffening member having longitudinally disposed substantially parallel portions adapted to slidably receive spaced-apart claws of an articulated pressure-transmitting means wherein one of the articulated elements of the pressure-transmitting means carries a resiliently urged elongate member having a detent portion disposed adjacent one of said claws for cooperation with said wiping member, said wiping member having receiving means including spaced-apart abutments for receiving said detent adjacent said one claw to substantially prevent relative longitudinal movement of the wiping member in either direction relative to said one claw while permitting relative longitudinal movement with respect to other claws.

13. An elongate resilient wiping member adapted to conform in wiping contact with a windshield surface, said wiping member including a back portion and a wiping portion, said back portion having a recess defining a notch intermediate its ends, pressure-transmitting means connected to said wiping element at longitudinally spaced locations and adapted to transmit pressure from a windshield wiper arm to said wiping member at said spaced locations, detent means on said pressure-transmitting means disposed adjacent only one of said connections for resilient holding engagement with said recess on said wiping member for restraining relative longitudinal movement of said wiping member in either longitudinal direction relative to said one connection while permitting relative longitudinal movement of said wiping member in either longitudinal direction with respect to said other connections.

References Cited in the file of this patent
UNITED STATES PATENTS

| 2,741,791 | Scinta | Apr. 17, 1956 |
| 2,741,792 | Ehrlich et al. | Apr. 17, 1956 |
| 2,907,065 | Macpherson | Oct. 6, 1959 |
| 2,924,839 | Anderson | Feb. 16, 1960 |
| 2,925,615 | Krohm | Feb. 23, 1960 |
| 3,003,174 | Anderson | Oct. 10, 1961 |

FOREIGN PATENTS

| 1,237,692 | France | June 20, 1960 |

UNITED STATES PATENT OFFICE
CERTIFICATE OF CORRECTION

Patent No. 3,130,437                          April 28, 1964

John W. Anderson

It is hereby certified that error appears in the above numbered patent requiring correction and that the said Letters Patent should read as corrected below.

Column 2, line 2, for "pressure-transmission" read -- pressure-transmitting --; line 3, for "wiper" read -- wiping --; same column 2, line 63, for "notch" read -- notches --; column 4, lines 49 and 50, for "operatively movable in the vertical longitudinal plane of said pressure-transmitting means to" read -- movable in the vertical longitudinal plane of said pressure-transmitting means to operatively --; column 5, line 33, for "ments" read -- means --.

Signed and sealed this 15th day of September 1964.

(SEAL)
Attest:

ERNEST W. SWIDER
Attesting Officer

EDWARD J. BRENNER
Commissioner of Patents